United States Patent
Suzuki

(10) Patent No.: US 7,495,706 B2
(45) Date of Patent: Feb. 24, 2009

(54) VIDEO SIGNAL SETTING DEVICE FOR PERFORMING OUTPUT SETTING TO A DISPLAY DEVICE

(75) Inventor: Takuya Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 561 days.

(21) Appl. No.: 11/210,061

(22) Filed: Aug. 23, 2005

(65) Prior Publication Data

US 2006/0044471 A1 Mar. 2, 2006

(30) Foreign Application Priority Data

Aug. 24, 2004 (JP) ............................. 2004-244366

(51) Int. Cl.
*H04N 3/27* (2006.01)
*H04N 5/46* (2006.01)
(52) U.S. Cl. ..................................... 348/554; 348/558
(58) Field of Classification Search ......... 348/554–558, 348/458, 452, 448
See application file for complete search history.

(56) References Cited

U.S. PATENT DOCUMENTS

| | | | |
|---|---|---|---|
| 6,549,243 B1 * | 4/2003 | Takashimizu et al. | ....... 348/558 |
| 6,862,399 B2 * | 3/2005 | Shimasaki et al. | ............ 386/68 |
| 2003/0137604 A1 * | 7/2003 | Takashimizu et al. | ....... 348/554 |
| 2005/0110905 A1 * | 5/2005 | Takashimizu et al. | ....... 348/558 |
| 2005/0117058 A1 * | 6/2005 | Nomura | ....................... 348/554 |
| 2006/0007359 A1 * | 1/2006 | Douangphachanh | ........ 348/554 |

FOREIGN PATENT DOCUMENTS

| | | |
|---|---|---|
| JP | 2000-13752 | 1/2000 |
| JP | 2001-103521 | 4/2001 |
| JP | 2001-269310 | 10/2001 |
| JP | 2003-324695 | 11/2003 |

OTHER PUBLICATIONS

Patent Abstracts of Japan, Publication No. 2001-269310, Publication Date Oct. 2, 2001, 1 page.
Patent Abstracts of Japan, Publication No. 2003-324695, Publication Date Nov. 14, 2003, 1 page.
Patent Abstracts of Japan, Publication No. 2000-013752, Publication Date Jan. 14, 2000, 1 page.
Patent Abstracts of Japan, Publication No. 2001-103521, Publication Date Apr. 13, 2001, 1 page.

* cited by examiner

*Primary Examiner*—Victor R Kostak
(74) *Attorney, Agent, or Firm*—Osha • Liang LLP

(57) ABSTRACT

In a video signal setting device, first, a setting screen displaying section in a system controller displays a setting screen on a TV receiver by an interlace video signal. After that, a progressive outputting section outputs a progressive signal to the TV receiver for a predetermined time with progressive setting. Next, an interlace output returning section returns a present output setting to an output setting to output the interlace video signal. Then a user sets a progressive output setting when a condition of screen by the progressive signal is normal and the user sets an interlace output setting in the case of not being normal.

2 Claims, 4 Drawing Sheets

FIG. 5

IF YES, PRESS 1, 2 AND 3
IN THIS ORDER.

IF NO, WAIT WITHOUT
PRESSING ANY KEY.

VIDEO SIGNAL SETTING DEVICE FOR PERFORMING OUTPUT SETTING TO A DISPLAY DEVICE

BACKGROUND OF THE INVENTION

1. Field of the Invention

The present invention relates to a video signal setting device provided in an optical disk player such as a DVD player and for performing output setting of either an interlace video signal or a progressive video signal to output to a display device.

2. Description of the Related Art

As a conventional scanning method for a moving image, there are classified broadly into interlace scanning and progressive scanning (noninterlace scanning). In the interlace scanning, one frame is configured by an odd field and an even field, in which pixel data with different times are repeated alternately every one line. In the progressive scanning, all pixels in one frame have the data with the same time.

For example, picture compression adopting MPEG-2 supports both of these scanning methods. However, when a CRT display device in computer, which displays an image by using the progressive scanning, displays a moving image with the interlace scanning, an image quality deteriorates due to an image moving across fields.

The interlace scanning is converted into the progressive scanning by using the method such as: line interpolation by copying the pixel data from an odd line into an even line; linear interpolation by interpolating by an average value; and a method in which a correction is not carried out at the location where an image moves at a small moving degree that has been calculated while linear interpolation is carried out at the location where an image moves at a large moving degree. (See JP-A-2001-269310, JP-A-2003-324695, JP-A-2000-13752 and JP-A-2001-103521.)

SUMMARY OF THE INVENTION

In a conventional optical disk player and so on, there are provided with a video signal setting device for performing output setting of either an interlace video signal or a progressive video signal to output to a TV receiver. When the TV receiver adopts an interlace scanning, the output setting in the video signal setting device is set so as to output the interlace video signal. When the TV receiver adopts a progressive scanning method, the output setting in the video signal setting device is set so as to output the progressive video signal.

Such an output setting, however, cannot be carried out without reading an instruction manual of the TV receiver on a user's side, which makes the setting operation burdensome and troublesome. When a progressive signal is mistakenly input to the TV receiver adopting an interlace scanning, a video image does not appear since this TV receiver cannot recognize a progressive signal. Then although trying to reset the output setting, a menu screen for setting does not appear without a video image appearing, which makes it impossible to reset.

In the related art disclosed in JP-A-2001-269310, although there is provided with a switching circuit for outputting selectively either an interlace video signal or a progressive video signal, the related art does not relate to a video signal setting device as mentioned herein for performing output setting of either an interlace video signal or a progressive video signal to output to a TV receiver.

In the related art disclosed in JP-A-2003-324695, although various interlace video signals or progressive video signals are converted into a format suitable to a display device to carry out displaying, the related art does not relate to a video signal setting device as mentioned herein for performing output setting of either an interlace video signal or a progressive video signal to output to a TV receiver, either.

The related art disclosed in JP-A-2000-13752 relates to selecting a method for converting an image scanning dynamically in accordance with the load of computer, and does not relate to a video signal setting device as mentioned herein for performing output setting of either an interlace video signal or a progressive video signal to output to a TV receiver, either.

The related art disclosed in JP-A-2001-103521 relates to recognizing whether the contents of video picture are in progressive or interlace, and does not relate to a video signal setting device as mentioned herein for performing output setting of either an interlace video signal or a progressive video signal to output to a TV receiver, either.

The invention has been achieved in order to solve the aforementioned problems. An object of the invention is to provide a video signal setting device that is capable of facilitating interlace output setting or progressive output setting even without reading an instruction manual of the TV receiver and that has a function of restoring a correct setting easily even when having carried out a wrong output setting.

To achieve the above object, a first aspect of the invention provides a video signal setting device for performing output setting of either an interlace video signal or a progressive video signal to output to a display device, wherein the video signal setting device is provided with a system controller comprising: a setting screen displaying means for displaying a setting screen by the interlace video signal regardless of the output setting; a progressive outputting means for outputting the progressive signal with a progressive setting for a predetermined time after a user has selected the output setting; and an interlace output returning means for returning to the output setting to output the interlace video signal after outputting the progressive signal for the predetermined time.

In this configuration, whether the output setting is in interlace setting or progressive setting, the setting screen is displayed on the display device by the setting screen displaying means by the interlace video signal. Then seeing the setting screen, a user selects the output setting of interlace setting or progressive setting. After that, the progressive outputting means outputs the progressive signal to the display device for a predetermined time with progressive setting. At this time, with the output of the progressive signal for a predetermined time, the user confirms whether the screen of the display device is normal or not.

After the output of the progressive signal for a predetermined time, the interlace output returning means returns the present output setting to the output setting to output the interlace video signal. Thereby since the setting screen by the interlace video signal is displayed on the display device, the user sets the progressive output setting when the condition of screen on the display device by the progressive signal with the output for the predetermined time is normal and the user sets the interlace output setting in the case of not being normal.

According to this configuration, alternate output of the interlace video signal and the progressive video signal facilitates setting the output of an effective video signal. In other words, interlace output setting or progressive output setting is facilitated even without reading an instruction manual of the TV receiver. Also, since the setting screen for interlace output setting and progressive output setting is displayed by the interlace video signal, a correct setting can be easily reset and restored even when having carried out a wrong output setting.

A second aspect of the invention provides a video signal setting device for performing output setting of either an interlace video signal or a progressive video signal to output to a display device, wherein the video signal setting device is provided with a system controller for: displaying a setting screen by the interlace video signal regardless of the output setting; and returning to the output setting to output the interlace video signal, after outputting the progressive signal with a progressive setting for a predetermined time after a user has selected the output setting.

In this configuration, whether the output setting is in interlace setting or progressive setting, the setting screen is displayed on the display device by the interlace video signal. Then seeing the setting screen, a user selects the output setting of interlace setting or progressive setting. After that, the progressive signal is output to the display device for a predetermined time with progressive setting. At this time, with the output of the progressive signal for a predetermined time, the user confirms whether the screen of the display device is normal or not.

After the output of the progressive signal for a predetermined time, the present output setting is returned to the output setting to output the interlace video signal. Thereby since the setting screen by the interlace video signal is displayed on the display device, the user sets the progressive output setting when the condition of screen on the display device by the progressive signal with the output for the predetermined time is normal and the user sets the interlace output setting in the case of not being normal.

According to this configuration, alternate output of the interlace video signal and the progressive video signal facilitates setting the output of an effective video signal. In other words, interlace output setting or progressive output setting is facilitated even without reading an instruction manual of the TV receiver. Also, since the setting screen for interlace output setting and progressive output setting is displayed by the interlace video signal, a correct setting can be easily reset and restored even when having carried out a wrong output setting.

A third aspect of the invention provides a video signal setting device according to the second aspect wherein the system controller comprises: a setting screen displaying means for displaying a setting screen by the interlace video signal regardless of the output setting; a progressive outputting means for outputting the progressive signal with a progressive setting for a predetermined time after a user has selected the output setting; and an interlace output returning means for returning to the output setting to output the interlace video signal after outputting the progressive signal for the predetermined time.

According to this configuration, whether the output setting is in interlace setting or progressive setting, the setting screen can be displayed on the display device by the interlace video signal. Also, the progressive signal can be output to the display device for a predetermined time with progressive setting. After the output of the progressive signal for a predetermined time, the present output setting can be returned to the output setting to output the interlace video signal.

According to the invention as described above, there is provided a video signal setting device for performing output setting of either an interlace video signal or a progressive video signal to output to a display device, wherein the video signal setting device is provided with a system controller comprising: a setting screen displaying means for displaying a setting screen by the interlace video signal regardless of the output setting; a progressive outputting means for outputting the progressive signal with a progressive setting for a predetermined time after a user has selected the output setting; and an interlace output returning means for returning to the output setting to output the interlace video signal after outputting the progressive signal for the predetermined time. Accordingly, alternate output of the interlace video signal and the progressive video signal facilitates setting the output of an effective video signal. In other words, interlace output setting or progressive output setting is facilitated even without reading an instruction manual of the TV receiver. Also, since the setting screen for interlace output setting and progressive output setting is displayed by the interlace video signal, a correct setting can be easily reset and restored even when having carried out a wrong output setting.

According to the invention, there is also provided a video signal setting device for performing output setting of either an interlace video signal or a progressive video signal to output to a display device, wherein the video signal setting device is provided with a system controller for: displaying a setting screen by the interlace video signal regardless of the output setting; and returning to the output setting to output the interlace video signal, after outputting the progressive signal with a progressive setting for a predetermined time after a user has selected the output setting. Accordingly, alternate output of the interlace video signal and the progressive video signal facilitates setting the output of an effective video signal. In other words, interlace output setting or progressive output setting is facilitated even without reading an instruction manual of the TV receiver. Also, since the setting screen for interlace output setting and progressive output setting is displayed by the interlace video signal, a correct setting can be easily reset and restored even when having carried out a wrong output setting.

BRIEF DESCRIPTION OF THE DRAWINGS

FIG. 5 is an example of subsequent display.

DETAILED DESCRIPTION OF THE PREFFERED EMBODIMENTS

Figure 1:
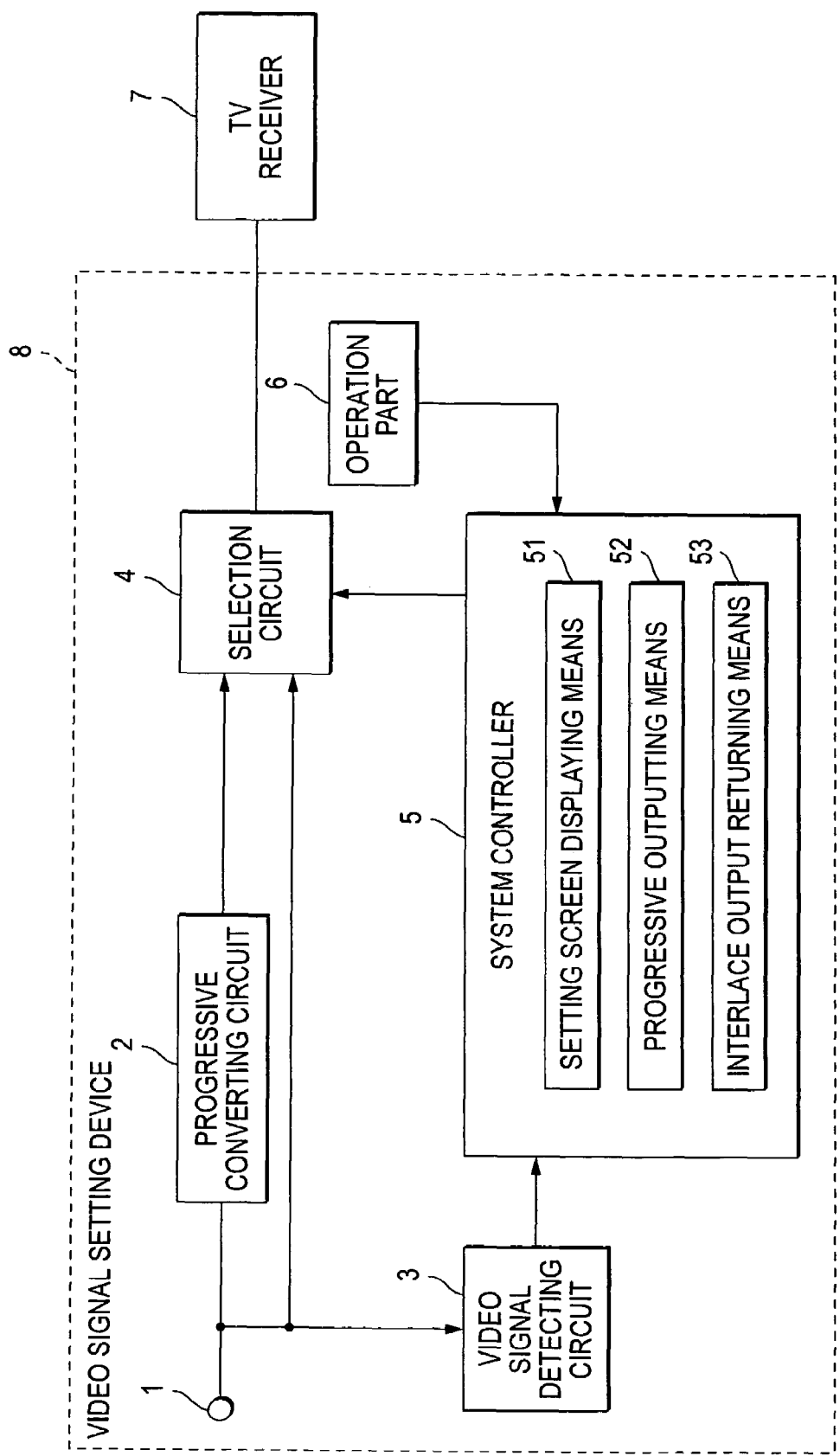
FIG. 1 is a block diagram showing a configuration of a video signal setting device according to an embodiment of the invention.

Hereafter, an embodiment of the invention will be described in reference to drawings. FIG. 1 is a block diagram showing a configuration of a video signal setting device according to an embodiment of the invention.

A video signal setting device 8 is provided in an optical disk player such as a DVD player. The video signal setting device 8 comprises: a video signal input terminal 1 to which an interlace video signal or a progressive video signal is input; a progressive converting circuit 2 for converting the interlace video signal into the progressive video signal; a video signal detecting circuit 3 for detecting an attribute of input video signal (interlace structure or progressive structure, number of effective vertical lines per field and number of effective horizontal dots per field); and a selection circuit 4 for selecting the interlace video signal from the video signal input terminal 1 or the progressive video signal from the progressive converting circuit 2.

The video signal setting device 8 is also provided with a system controller 5 comprising: a setting screen displaying means 51 for displaying a setting screen by the interlace video signal regardless of the output setting; a progressive outputting means 52 for outputting the progressive signal with a progressive setting for a predetermined time after a user has selected the output setting; and an interlace output returning means 53 for returning to the output setting to output the interlace video signal after outputting the progressive signal for the predetermined time. In addition, the video signal setting device 8 is provided with an operation part 6 for carrying out key operation for output setting of the video signal and a TV receiver 7, for example, as a display device for imaging by inputting the video signal selected in the selection circuit 4.

Figure 2:
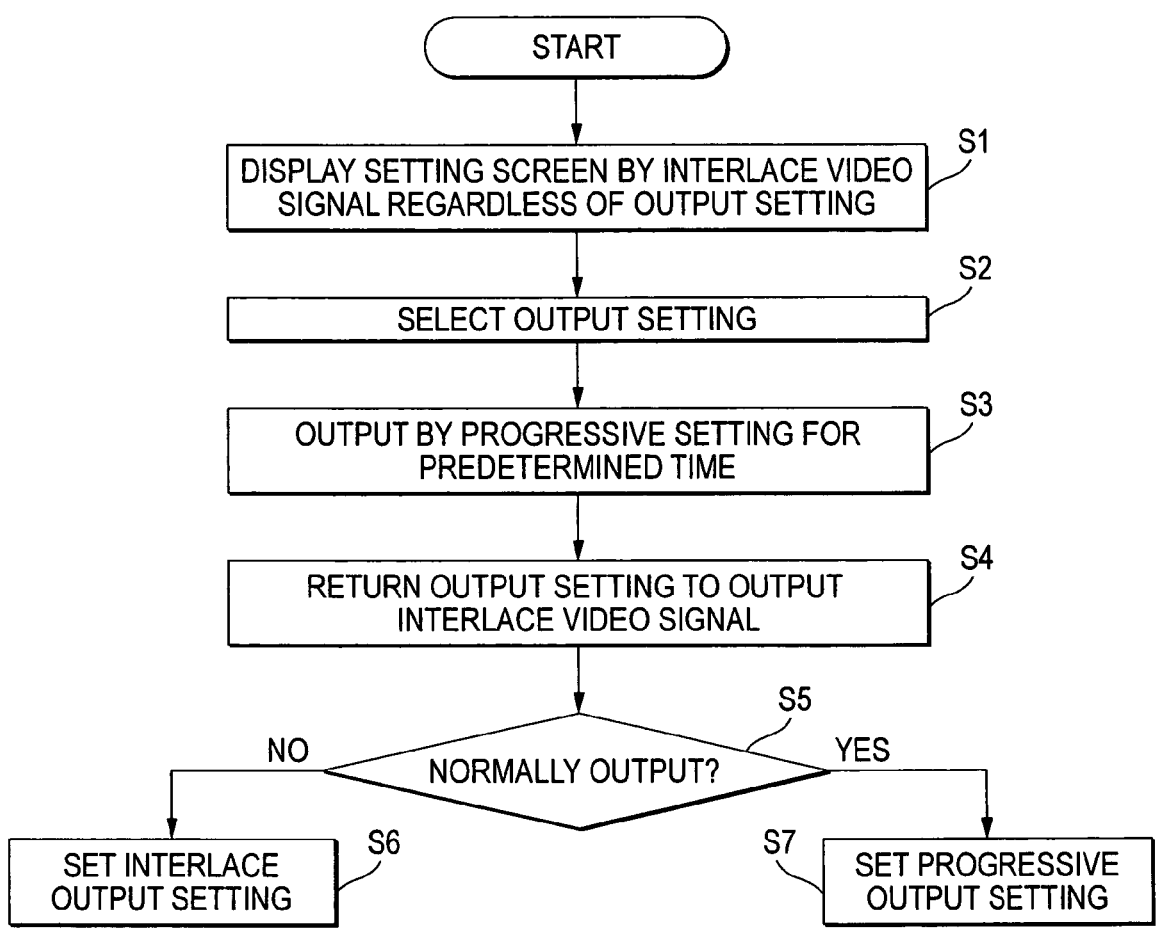
FIG. 2 is a flowchart for explaining a process for switching an output setting of a video signal in the embodiment.

FIG. 2 is a flowchart for explaining a process for switching the output setting of the video signal in this embodiment. There will be described the process for switching the output setting of the video signal in reference to this flowchart.

Figure 3:
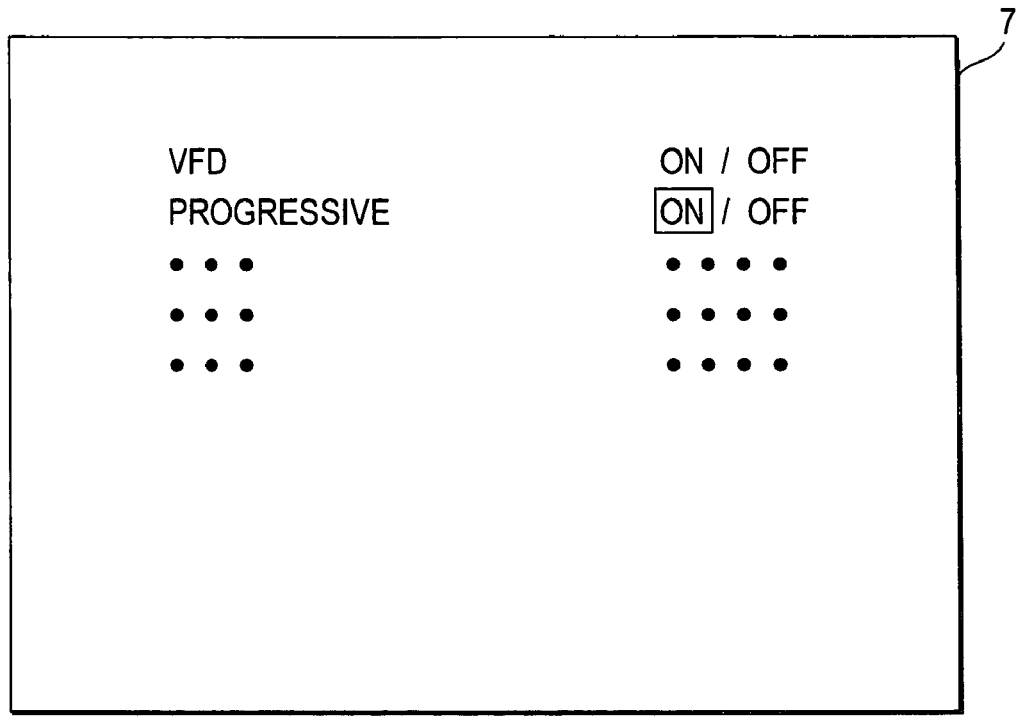
FIG. 3 is an example of display.

With the operation of the operation part 6, the setting screen displaying means 51 in the system controller 5 displays a setting screen on the TV receiver 7 by the interlace video signal regardless of the output setting, whether the output setting is interlace setting or progressive setting (step S1). Then seeing the setting screen on the TV receiver 7, a user selects the output setting of interlace setting or progressive setting (step S2, FIG. 3).

Figure 4:
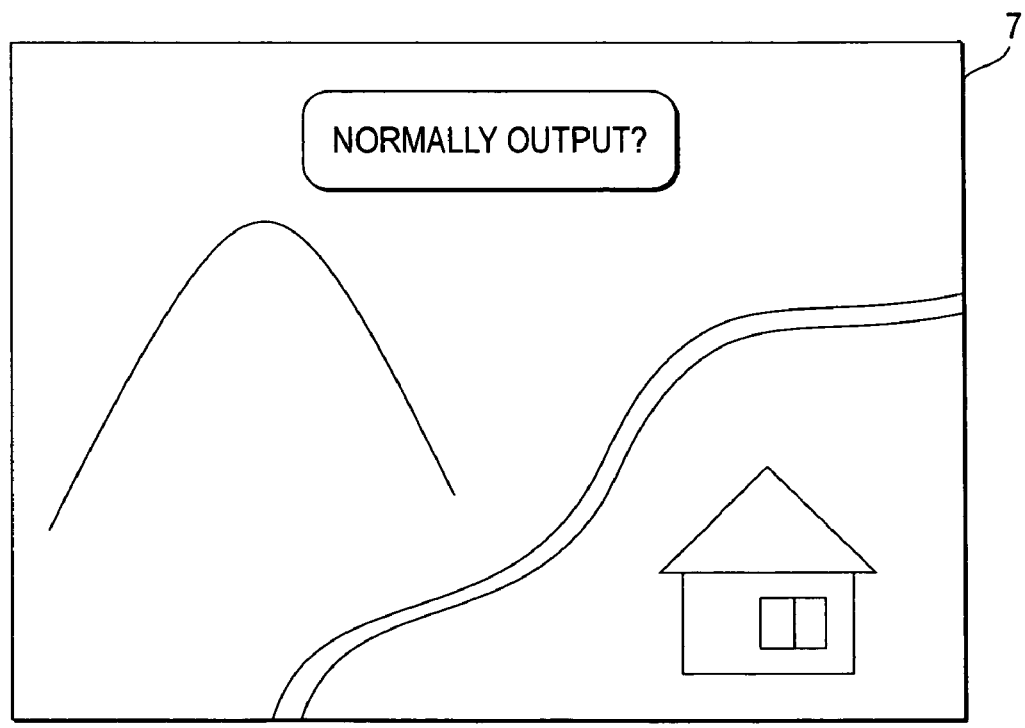
FIG. 4 is an example of subsequent display.

After that, the progressive outputting means 52 in the system controller 5 outputs the progressive signal to the TV receiver 7 for a predetermined time (for example, 5 seconds) with progressive setting by controlling the selection circuit 4 (step S3, FIG. 4). At this time, with the output of the progressive signal for a predetermined time, the user confirms whether the screen of the TV receiver 7 is normal without distortion or not.

After the output of the progressive signal for a predetermined time to the TV receiver 7, the interlace output returning means 53 in the system controller 5 returns the present output setting to the output setting to output the interlace video signal by controlling the selection circuit 4 (step S4). Thereby since the setting screen by the interlace video signal is displayed on the TV receiver 7, the user sets the progressive output setting when the condition of screen on the TV receiver 7 by the progressive signal with the output for the predetermined time is normal by operating the operation part 6 (step S7, FIG. 5) and the user sets the interlace output setting in the case of not being normal (step S6).

As described above, alternate output of the interlace video signal and the progressive video signal facilitates setting the output of an effective video signal. In other words, interlace output setting or progressive output setting is facilitated even without reading an instruction manual of the TV receiver. Also, since the setting screen for interlace output setting and progressive output setting is displayed by the interlace video signal, a correct setting can be easily reset and restored even when having carried out a wrong output setting.

What is claimed is:

1. A video signal setting device for performing output setting of either an interlaced video signal or a progressive video signal to output to a display device, comprising:
   a setting screen displaying section which is configured to output the interlaced video signal to cause the display device to display a setting screen regardless of the output setting which is previously set in the video signal setting device, the setting screen allowing a user to perform the output setting;
   a progressive outputting section which is configured to output the progressive video signal to the display device for a predetermined time after the user performs the output setting; and
   an interlaced output returning section which is configured to return the output setting to output the interlaced video signal to cause the display device to display the setting screen after the predetermined time has elapsed.

2. A video signal setting method for performing output setting of either an interlaced video signal or a progressive video signal to output to a display device in a video signal setting device, comprising:
   outputting the interlaced video signal to cause the display device to display a setting screen regardless of the output setting which is previously set in the video signal setting device, the setting screen allowing a user to perform the output setting;
   outputting the progressive video signal to the display device for a predetermined time after the user performs the output setting; and
   returning the output setting to output the interlaced video signal to cause the display device to display the setting screen after the predetermined time has elapsed.

\* \* \* \* \*